Feb. 18, 1969    V. A. NILES    3,428,783
PRESSURE COOKING APPARATUS
Filed Feb. 27, 1967    Sheet 1 of 3

VERGIL A. NILES
INVENTOR.

BY

Robert K. Rhea
AGENT

Feb. 18, 1969    V. A. NILES    3,428,783
PRESSURE COOKING APPARATUS

Filed Feb. 27, 1967    Sheet 3 of 3

INVENTOR.
VERGIL A. NILES
BY
Robert K. Rhea
AGENT

United States Patent Office 3,428,783
Patented Feb. 18, 1969

3,428,783
PRESSURE COOKING APPARATUS
Vergil A. Niles, 403½ Main St., Yukon, Okla. 73099
Filed Feb. 27, 1967, Ser. No. 618,967
U.S. Cl. 219—399    3 Claims
Int. Cl. H05b 3/04; F24c 7/04

ABSTRACT OF THE DISCLOSURE

A pressure cooking apparatus having a sealed oven, a hot air pressure chamber and a conduit with a valve connecting said pressure chamber with said oven for providing said oven with hot air under pressure. A motor driven compressor for supplying air under pressure to the pressure chamber and an electric heater in said pressure chamber for heating said air.

Background of the invention

The present invention relates to pressure broilers and more particularly to an apparatus and method of broiler cooking by means of heated air under pressure.

There are many types of broilers in use which depend upon various sources of heat such as electric, gas, charcoal, coal or infra red rays. These broilers depend, for their operation, on the transmission of heat through the air of the container to the surface of the food to be broiled. In many instances this results in prolonged broiling time and a nonuniform broiling of the food stuff which is sometimes a result of improper operation of the broiler or inattention of the operator.

Ths invention eliminates the above disadvantages by providing an apparatus for fast and uniform cooking resulting in cooked foodstuffs having a palatable flavor. This invention also provides means for quickly heating and serving prepared and frozen meals supplied from a deep freeze unit as well as providing means for quickly defrosting frozen foods. The invention is not limited to its cooking features but many be used for drying articles or sterilizing utensils by the movement of hot air.

The Austin Patent No. 2,339,794 uses compressed air subjected to radiant heat for cooking food in an oven but he further relies on subjecting his food to a source of radiant heat to complete the cooking process.

The Thomas Patent No. 1,732,289 discloses cooking foods by the heat of compressed air which is directed toward the food after impinging on the curved walls of an oven. This patent relies on a fuel burner for heating the air within its conveyor tube prior to entering the oven and thus uses substantially as much or more fuel for the cooking process than in conventional gas fired ovens.

The Triplett Patent No. 1,768,172 discloses cooking food in an oven by applying heat to the exterior thereof and injecting preheated air under pressure into the container wherein the preheated air forms a vapor ventilating stream for removing gases cooked out of the food.

The Macchi et al. Patent No. 3,169,871 discloses cooking foods by jets of hot air impinged on the food or the containers therefor. This patent, like the Thomas patent, requires a supply of fuel for heating the air to the desired temperature and thus is not as economical in operation as a conventional gas fired oven.

This invention is an improvement over the above referred to prior patents in that it provides an air tight insulated oven connected with a compressed air chamber having a heating element maintaining the compressed air therein to a desired preheated temperature. Control means permits exhausting air from the oven and injecting the preheated air into the oven wherein the condition of the food may be readily observed through a glass in the oven door. Control means regulates the pressure and temperature of the air in the ovens. Natural juices contained by the foods are retained therein adding to the flavor of the food and materially reducing shrinkage due to cooking.

Summary of the invention

This invention comprises means for cooking or processing food, drying or sterilizing articles by hot air under pressure within a sealed chamber. A door equipped oven is connected with a hot air supply chamber in turn connected with a motor driven compressor. The air within the supply chamber is electrically heated. Control valves regulate the pressure and temperature of the air within the supply chamber and the oven.

The principal objects of the invention are to provide an apparatus for quickly cooking foods and drying or sterilizing articles by hot air under pressure.

Description of the preferred embodiment

Figure 1:
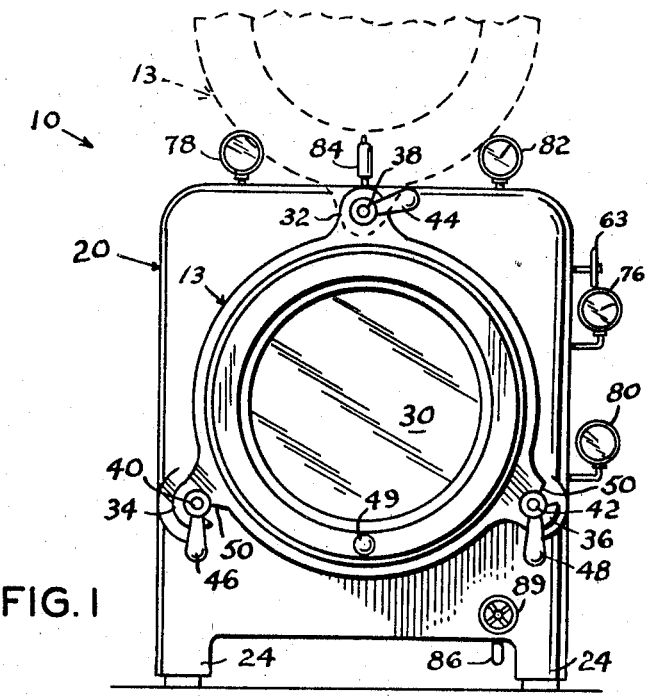
FIGURE 1 is a front elevational view of the device illustrating, by dotted lines, its door when in open position.
Figure 4:
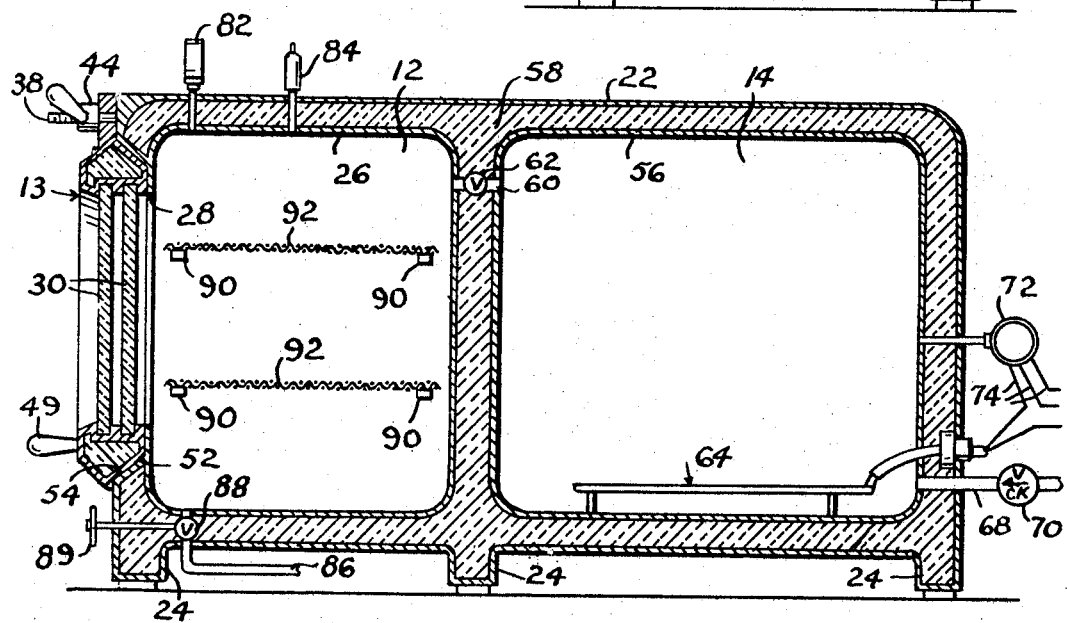
FIGURE 4 is a cross-sectional view taken substantially along the line 4—4 of FIG. 3; and, FIGURE 5 is a horizontal cross-sectional view, partially in elevation, taken substantially along the line 5—5 of FIG. 2.
Figure 2:
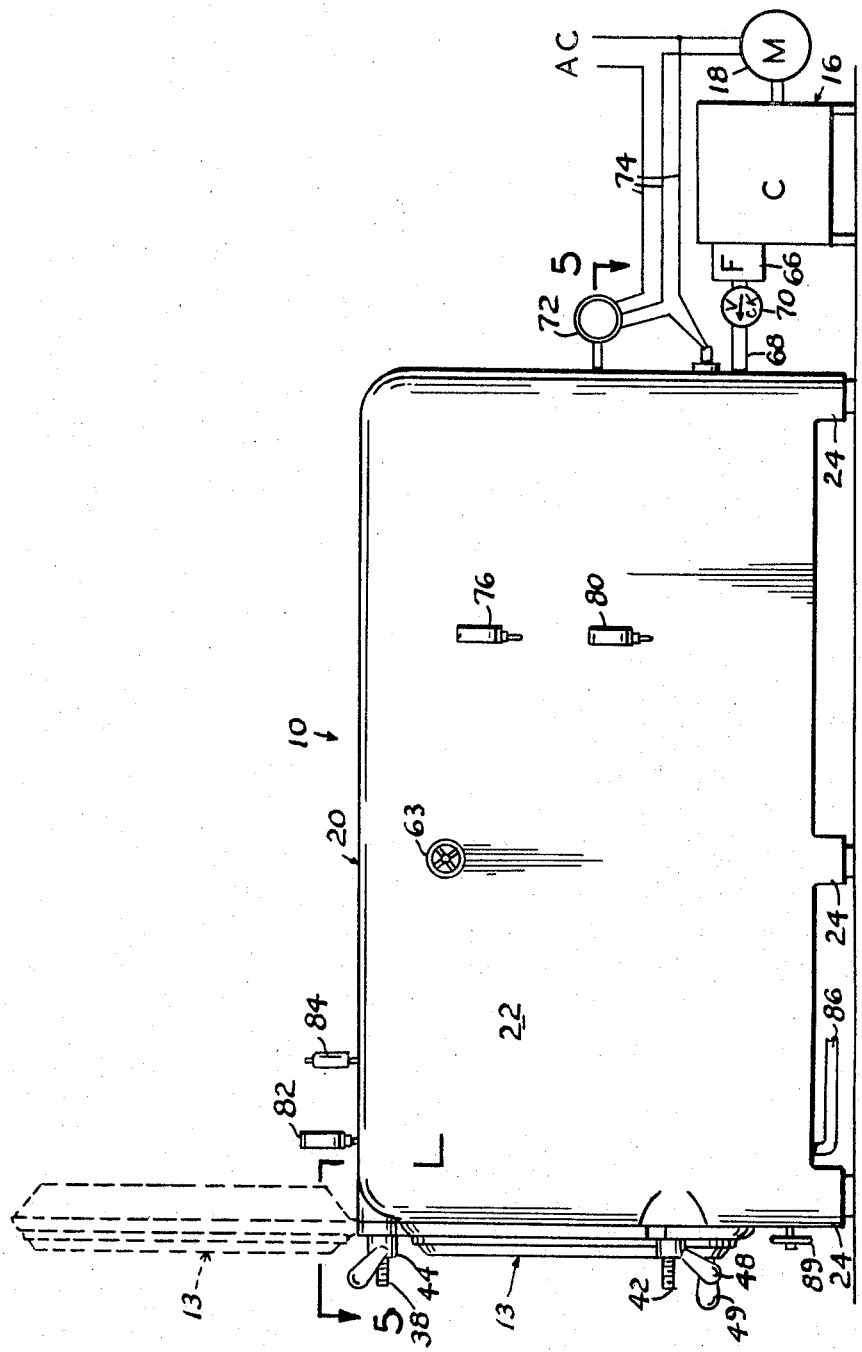
FIGURE 2 is a side elevational view of FIG. 1.
Figure 3:
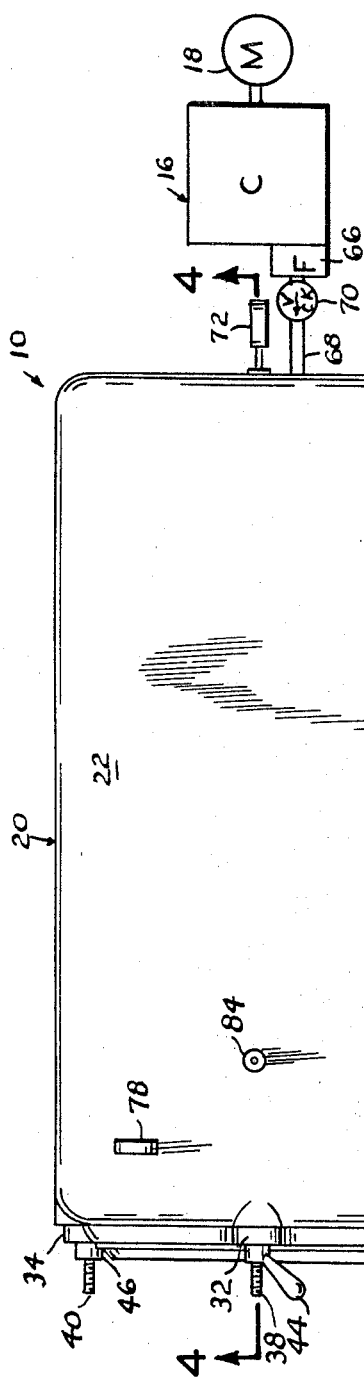
FIGURE 3 is a top plan view.
Figure 5:
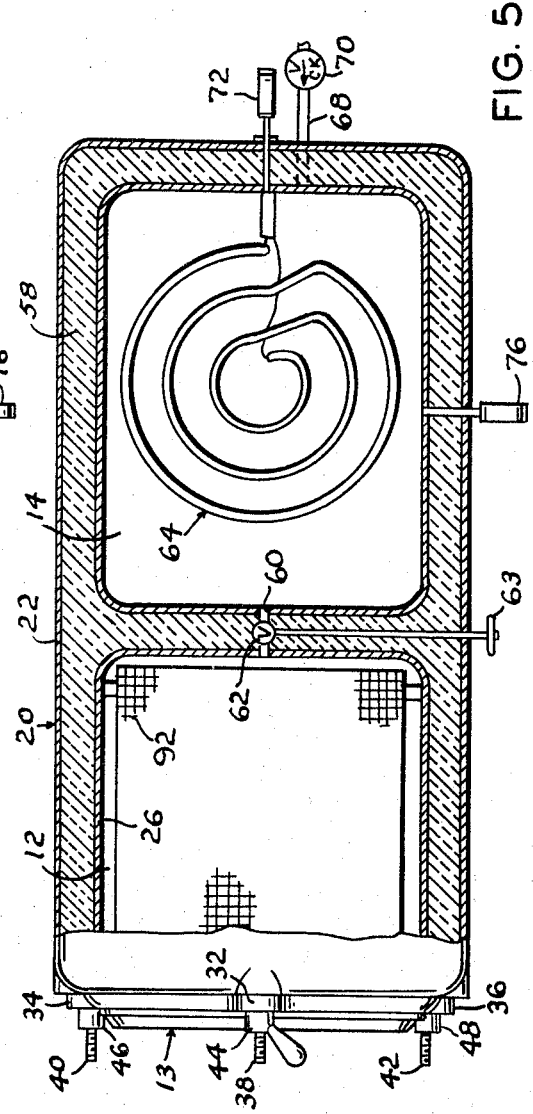

The reference numeral 10 indicates the apparatus, as a whole, which is rectangular in general configuration comprising a cooking unit 20 and a compressor 16 driven by a motor 18. The unit 20 includes an oven 12 having a door 13 and an air chamber 14, shown interconnected, but which may be formed separately, if desired. The unit 20 has an outer surrounding wall 22 supported by legs 24 and having an oven door opening in one end. The oven 12 comprises a substantially rectangular wall 26 spaced and supported inwardly of the top, bottom and sides of the outer wall 22 adjacent the door end of the oven. An opening 28 is formed in the oven wall 26 for receiving the door 13. The door 13 is circular in general configuration and is centrally provided with a pair of spaced-apart parallel glass panels 30 providing heat insulation and visual inspection of the oven interior. The door is connected to the front end of the unit 20 by outstanding lugs 32, 34 and 36 formed on its periphery and engageable with stud bolts 38, 40 and 42, respectively, connected to the wall 22. Handle equipped nuts 44, 46 and 48, respectively, are threadedly engaged with the studs for releasing and closing the door. The lug 32 forms a door hinging lug, for movement of the door about the axis of the stud 38 by means of a door handle 49, whereas the lugs 34 and 36 are each provided with a lateral slot 50 for removably receiving the respective stud. The door 13 is provided with an inwardly directed or converging beveled edge 52 which engages, in sealing relation, a cooperating beveled or outwardly diverging edge 54 formed by the walls 22 around the oven opening 28.

The air chamber 14 is similarly formed by a substantially rectangular wall 56 arranged and supported in spaced parallel relation inwardly of the top, bottom and one end of the outer wall 22 and in spaced relation with the adjacent portion of the wall 26 of the oven 12. The volume of the air chamber 14 must be greater than the volume of the oven for the reasons readily apparent. Obviously a relatively large separate chamber 14 may be provided for supplying heated air to a plurality of ovens 12. The spacing between the respective walls of the oven and chamber and the inner surface of the outer wall 22 is filled with heat insulating material 58. A conduit 60 extends between the oven 12 and chamber 14 for communication therebetween. A control valve 62, having a control handle 63, is interposed in the conduit 60 for the purposes presently described.

An electrical heating element 64 is mounted within the air chamber 14 and connected with a source of electrical energy, not shown. The air compressor 16 and motor 18 are conventional. The air compressor is preferably provided with a filter 66 and is connected with the air chamber 14 by a conduit 68 through a check valve 70. An air pressure and heat responsive thermostat 72 is interconnected with the source of electrical energy, not shown, the motor 18 and heating unit 64, by wires 74 for the purposes presently apparent.

Pressure gages 76 and 78 are connected, respectively, with the air chamber 14 and oven 12. Similarly temperature gages 80 and 82 are connected with the air chamber 14 and oven 12. The oven is provided with an adjustable pop-off or escape valve 84. The oven is further provided with a drain and exhaust conduit 86 having a control valve 88 provided with a control handle 89. Opposing interior surfaces of the walls of the oven are provided with support members 90 for supporting wire racks or shelves 92, or the like, which in turn support food or other articles within the oven.

Operation

In operation the handle equipped nuts 44, 46 and 48 are loosened to permit the door to move outwardly of the inclined surface 54 and be swung upwardly, around the axis of the stud 38, by means of its handle 49 to the position shown by dotted lines (FIG. 1), where it is maintained in an elevated out-of-the-way position by the nut 44. Food to be cooked or articles treated by hot air is placed within the oven 12 on one or both of the racks 92 and the door is swung back into place and closed by the handle equipped nuts thus sealing the oven air tight. The air chamber 14 contains air under a predetermined pressure and heated to a desired temperature. The valve 62 is opened to admit this hot air to the oven 12. During this action the drain or vent valve 88 may be cracked or partially open to exhaust cold air initially contained by the oven. The valve 88 is then closed. After a desired quantity of heated air, from the chamber 14, has filled the oven 12, as is indicated by the pressure gage 78 and temperature gage 82, the valve 62 is closed to allow the material, placed on the racks 92, to be processed as desired by the heated air. For example, meat such as a roast, not shown, may be placed on the rack and hot air, under approximately two atmospheres pressure and a temperature of approximately 350° F., fills the oven. The hot air sears the outer surface of the meat thus retaining its natural juices while the pressurized hot air tends to convert moisture within the meat to steam which breaks down the meat fibers and hastens the cooking process. The valve 84 maintains the pressure constant while the temperature is held constant by admitting additional heated air from the chamber 14. During this time any reduction of the air pressure or temperature within the air chamber 14 is replenished and heated by the compressor 16 and heating element 64. After a predetermined interval of time, determined by the food or articles being processed, the air pressure within the oven 12 is released by opening the valve 88. When the pressure within the oven 12 equals atmospheric pressure the door 13 is opened and the food removed.

Alternatively the food or articles placed on the racks 92 may be treated by hot air under a selected pressure determined by the regulation of the pop-off valve 84 by permitting hot air to continuously enter the oven from the air chamber 14 through the valve 62. Obviously each of the valves may be arranged for automatic control of both temperature and pressure.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A pressure cooking apparatus, comprising: a housing, said housing having an outer wall provided with an opening; an inner wall within said housing, said inner wall defining an oven having an opening coinciding with the opening in said outer wall; door means hermetically sealing the openings; a pressure chamber remote from said oven; means supplying air under superatmospheric pressure to said pressure chamber; means heating the air in said pressure chamber; control means connecting said pressure chamber with said oven; means controlling the superatmospheric pressure and temperature of hot air within said oven and said pressure chamber; said door means being hingedly connected with the outer wall of said housing for movement in a vertical plane toward and away from the openings in said housing and said oven; bolt and nut means locking said door when in open and closed position;

said pressure chamber comprising a second inner wall within the outer wall of said housing; heat insulating material surrounding said oven and said pressure chamber within the outer wall of said housing;

said means supplying air comprising an air compressor connected with said pressure chamber; a motor drivably connected with said air compressor; and said means heating the air comprising an electrical resistance element disposed within said pressure chamber and connected with a source of electrical energy.

2. Structure as specified in claim 1 in which the control means comprises a conduit extending between and connected with adjacent walls of said oven and said pressure chamber; and a valve interposed in said conduit.

3. Structure as specified in claim 2 in which the hot air superatmospheric pressure and temperature controlling means includes a pressure release valve connected with said oven; an exhaust and drain valve connected with said oven; and a pressure-temperature responsive switch connected with said pressure chamber; and wiring interconnecting said pressure-temperature switch, said electrical resistance element and said motor with the source of electrical energy.

References Cited

UNITED STATES PATENTS

| 1,732,289 | 10/1929 | Thomas | 911—1 |
| 1,958,590 | 5/1934 | Peirce | 219—401 |
| 1,768,172 | 6/1930 | Triplett | 99—1 |
| 2,339,974 | 1/1944 | Austin | 99—1 |
| 3,030,486 | 4/1962 | Lashley | 219—401 X |
| 3,169,871 | 2/1965 | Macchi et al. | 99—1 |

BERNARD A. GILHEANY, *Primary Examiner.*

VOLODYMYR Y. MAYEWSKY, *Assistant Examiner.*

U.S. Cl. X.R.

219—401; 99—1, 107, 331